United States Patent

[11] 3,584,693

| [72] | Inventor | Rheinhard Bobrowski<br>Morris, Manitoba, Canada |
|---|---|---|
| [21] | Appl. No. | 853,161 |
| [22] | Filed | Aug. 26, 1969 |
| [45] | Patented | June 15, 1971 |
| [73] | Assignee | Inland Steel & Forgings Ltd.<br>Winnipeg, Manitoba, Canada |

[54] SPRING-LOADED DEVICE FOR HARROW SECTIONS
4 Claims, 3 Drawing Figs.

[52] U.S. Cl. ................................................. 172/462,
172/497, 172/572
[51] Int. Cl. ............................................................ A01b 65/06
[50] Field of Search............................................ 172/462,
466, 472, 491, 497, 498, 499, 500, 503, 505, 506,
551, 572

[56] References Cited
UNITED STATES PATENTS

| 369,286 | 8/1887 | Henderson | 172/500 |
|---|---|---|---|
| 857,833 | 6/1907 | Ricketts | 172/500 |
| 913,729 | 3/1909 | Hyland | 172/551 |
| 1,460,585 | 7/1923 | Howe et al. | 172/500 |
| 2,520,345 | 8/1950 | Starr | 172/500 |
| 3,086,598 | 4/1963 | Gellner | 172/462 |

Primary Examiner—Robert E. Pulfrey
Assistant Examiner—C. W. Hanor
Attorney—Kent and Ade ABSTRACT: A vertical rod extending downwardly through a pivot bearing on the end of the drawbar arm and is connected to the harrow section. A cable is secured to the top of this rod and extends downwardly to the drawbar arm, around a sheave thereon, and along the arm to a tension spring secured to the arm. Rotation of the drawbar arms downwardly thus extending the spring and transferring this pressure via the cable to the top of the rod which in turn presses the harrow sections into the ground.

PATENTED JUN 15 1971

3,584,693

INVENTOR
RHEINHARD BOBROWSKI

BY

AGENTS.

SPRING-LOADED DEVICE FOR HARROW SECTIONS

This invention relates to new and useful improvements in drag harrows, particularly in the means for applying positive downward pressure to the harrow sections.

Under certain circumstances it is desirable to apply downward pressure upon the harrow sections in order to control the ground engaging characteristics thereof. Normally this is done by weighting the sections or, alternatively, having compression springs which surround a rod extending from the end of the drawbar arms and the harrow sections.

The disadvantage of the first method is that it is difficult to adjust in use inasmuch as the weights have to be changed.

The second method also suffers from disadvantages, the principle one of which is the fact that the spring is exposed to corrosion and dirt and therefore often becomes clogged and inoperative. Furthermore, it is difficult to control the downward pressure inasmuch as the compression spring tends to give a bouncing action to the harrows particularly if relatively rough ground is being harrowed.

I have overcome the disadvantages of the conventional methods by providing a tension spring and cable the majority of which is shielded by the drawbar arms and which furthermore applies positive downward pressure upon the rods extending through the ends of the arms to the harrow sections. I have found that this tension spring and cable assembly enables relatively fine control of the pressure to be maintained.

The principle object and essence of the invention is therefore to provide a device of the character herewithin described in which rotation of the main harrow drawbar frame by the hydraulic piston and cylinder assemblies normally present, enables the desired downward pressure to be applied to the harrow sections being drawn by the harrow drawbar.

Another object of the invention is to provide a device of the character herewithin described which does not interfere with the lifting characteristics of the harrow drawbar wherein the harrow sections are lifted clear of the ground for transportation purposes. An important object flowing from this object is the fact that when the harrow sections are lifted clear, the rods slide downwardly to the fullest extent of their travel so tat there is no bouncing pressure upon the tension springs during transportation.

Another object of the invention is to provide a device of the character herewithin described which is equally applicable for use with both parallel diamond and coil spring tine harrow systems.

In summary I have provided a tension spring anchored to the arm near the inboard end and being connected to a cable which extends around a sheave adjacent the outboard end of the arm. A harrow section support rod slides vertically in a pivot-bearing block also mounted in the outboard end of the arm and the cable runs vertically parallel to the rod and is secured to the upper end so that if the distal end of the arm is moved down the tension spring extends and transfers this pressure to downward pressure on the rod and hence onto the harrow sections.

Another object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying Figures in which:

In the drawings like characters of reference indicate corresponding parts in the different figures.

Figure 1:
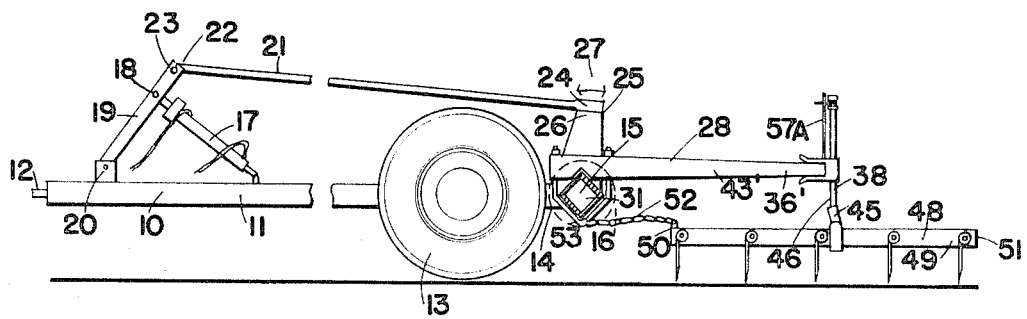
FIG. 1 is a side elevation showing a harrow drawbar in section with one arm and one harrow section included.

Proceeding therefore to describe the invention in detail, FIG. 1 shows, in side elevation, a harrow drawbar assembly 10 including the hitching member 11 terminating in a tractor hitch or the like 12 at the forward end thereof. Ground-engaging wheels 13 (one only of which is shown) support the rear end 14 of this chassis member and a main harrow drawbar frame component 15 is mounted within these rear ends 14 for rotation, typical bearings being shown in phantom by the reference character 16. This construction is conventional and it is therefore not deemed necessary to illustrate and describe same further.

An hydraulic piston and cylinder assembly 17 is mounted on the hitch frame or chassis 11 and is pivotally connected by pivot pin 18 to a link arm 19 intermediate the ends thereof. This link arm is pivotally connected by pivot pin 20 at the lower end thereof also to the chassis 11 as clearly shown in FIG. 1.

Actuating rods 21 are pivotally connected by one end thereof to the upper end 22 of the link 19 by means of pivot 23 and extend forwardly to be pivotally connected by pivot pin 24, to the upper ends 25 of arms 26 which are secured to and extend upwardly from the drawbar frame component 15. By connecting the piston and cylinder assembly to a source of hydraulic fluid in the usual way, the arms 26 together with the component 15 may be partially rotated within bearings 16, in the direction of double-headed arrow 27.

Extending rearwardly from the component 1 and secured thereto is a plurality of drawbar arms 28 which are substantially U-shaped in cross-sectional configuration. The forward or inboard ends 29 are notched as at 30 to fit over the upper corner 31 of the component 15 which is of square cross section. Details of this connection is shown in detail in FIG. 2.

A U-bolt assembly 32 extends around the component 15 with the arms 33 extending upwardly through the arm 28 and through apertures in the upper surface 34 thereof whereupon nuts 35 clamp the arms firmly in position upon the component 15. From the foregoing it will be appreciated that partial rotation of the component 15 will cause the distal or outer ends 36 of the arms 28 to move in an arc generally indicated by the double-headed arrow 37 in FIG. 2.

A vertically situated rod 38 is journaled for vertical sliding movement within a pivot bearing assembly collectively designated 39, it being understood that there is one assembly for each of said arms 28.

Figure 3:
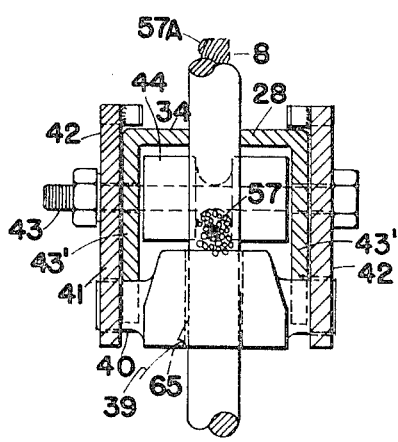
FIG. 3 is a section along the line 3–3 of FIG. 2.

This pivot-bearing assembly includes pivots 40 extending outwardly therefrom and engageable within an end cap assembly collectively designated 41. This end cap assembly consists of sideplates 42 secured upon each side of the distal end 36 of the arms by means of nut and bolt assembly 43 extending through the sides 43' and through the sideplates 42 of the arms 28 as clearly shown in FIG. 3.

This nut-and-bolt assembly 43 also journals for rotation a sheave or pulley type member 44 situated between the sides 43' of the arm 36.

The pivot members 40 of the block 39 lie normal to the longitudinal axis of the arms 28.

A link 45 is secured to the lower end 46 of the rod 38 and this link is pivotally secured to a clevis 47 which in turn is secured to the upper side 48 of the drag harrow section 49 substantially between the front and rear ends 50 and 51 thereof respectively.

Figure 2:
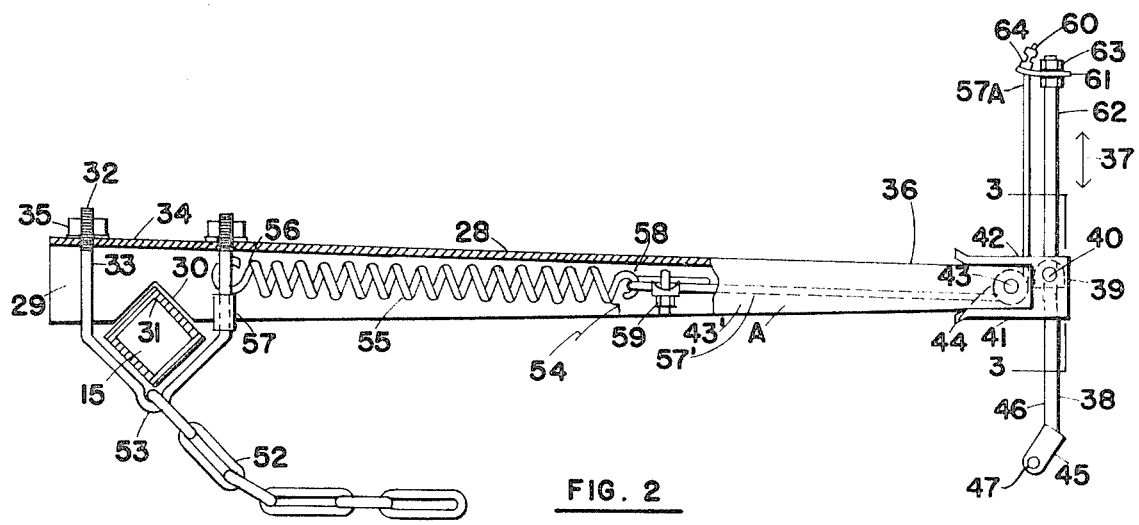
FIG. 2 is an enlarged partially sectioned view of one arm showing the invention incorporated therein.

An anchor chain 52 extends from the front side 50 to the lower side 53 of the aforementioned U-bolt assembly 32 as clearly shown in FIG. 2.

Means to apply varying downward pressure upon the drag harrow sections 49 are provided and take the form of a spring and cable assembly collectively designated 54.

This includes a relatively heavy duty tension spring 55 hooked by end 56 around one of the arms 33 of the U-bolt assembly 32. In this connection a collar 57 surrounds this arm to prevent the spring from moving downwardly This spring is located within the channel forming the arm 28 as clearly shown in FIG. 2.

A cable 57' extends around the other end 58 of spring 55 and is clamped to itself by means of clamp 59.

This cable extends within the channel forming the arm 28, to adjacent the distal end 36 and around the sheave or pulley 44 mounted thereon and described previously. The cable then extends upwardly substantially vertically and parallel with the rod 38, this portion of the cable being indicated by reference character 57A. The end 60 of the cable extends through and apertured attachment plate 61 which is secured to the upper end 62 of the rod 38 by means of nut assembly 63. A stop 64 is then secured to this end 60 of the cable to prevent it from disengaging from the plate 61.

In operation, rotation of the main drawbar frame component 15 in an anticlockwise direction with reference to FIG. 2, by means of the hydraulic piston and cylinder assembly 17 will cause the ends 36 of the arms 28 to move upwardly so that the rods 38 slide downwardly to the limit of their travel whereupon further upward movement of the ends 36 will cause the rods to lift the harrow sections 49 clear of the ground hanging by the chains 52 so that the device is ready for transporting.

When in use for harrowing, the reverse takes place namely the component 15 is rotated clockwise with respect to FIG. 2 so that the harrow sections engage the ground and the end 36 moves downwardly on the rod 38. As further downward movement occurs, the cable 57' stretches the spring 55 and this pressure generated by the spring 55 is transferred via cable 57' to the upper end of rod 38 and exert a vertical downward pressure upon these rods and hence upon the harrow sections thus controlling the penetration characteristics of the harrow sections with the ground. The pivotal mounting of the bearing block 39 prevents binding from occuring between the rods 38 and the vertical drilling or bearing aperture 65 extending downwardly through this block 39.

Various modifications can be made within the scope of the inventive concept which is herein disclosed and/or claimed.

What I claim as my invention is:

1. In a harrow drawbar assembly which includes a main drawbar frame component, hydraulic means to partially rotate said component, a plurality of drawbar arms secured to and extending rearwardly from said component and a plurality of drag harrow sections supported by said arms; means to apply varying downward pressure upon said sections to control the ground engaging characteristics thereof, said means including a vertically situated rod, means mounting said rod for substantially vertical sliding movement in the distal end of the arms, the lower end of said rod being linked to said harrow section between the front and rear ends thereof, and a cable and spring assembly extending between the upper end of said rod and an anchor point adjacent the inner end of said arm, said cable and spring assembly including a sheave adjacent said distal end of said arm around which said cable engages, said cable and spring assembly including a tension spring, said tension spring being anchored by one end thereof to adjacent the inner end of said arm, said cable being anchored by one end thereof to the other end of said spring, said cable, after extending around said sheave, running substantially parallel to said rod and being secured to the upper end of said rod by the other end of said cable.

2. The device according to claim 1 in which said means for mounting said rod for substantially vertical sliding movement comprises a block pivotally secured in the distal end of said arm, said pivot being normal to the longitudinal axis of said arm, said block having a rod receiving bearing apertured therethrough.

3. A harrow drawbar assembly comprising in combination a plurality of drawbar arms extending rearwardly from said drawbar and being secured thereto for partial rotation thereby, drag harrow sections operatively connected to the distal ends of said arms, said operative connection including rods slidable vertically through each of said arms at the distal ends thereof, said rods being link connected by the lower ends thereof to said draw harrow sections and means to apply varying downward pressure upon said sections to control the ground-engaging characteristics thereof, said means including means mounting said rods for said substantially vertical sliding movement in the distal ends of said arms, ad a cable and spring assembly extending between the upper end of said rods and anchor points adjacent the inner ends of said arms, said cable and spring assembly including a sheave adjacent said distal end of said arm around which said cable engages, said cable and spring assembly including a tension spring, said tension spring being anchored by one end thereof to adjacent the inner end of said arm, said cable being anchored by one end thereof to the other end of said spring, said cable, after extending around said sheave, running substantially parallel to said rod and being secured to the upper end of said rod by the other end of said cable.

4. The device according to claim 3 in which said means for mounting said rod for substantially vertical sliding movement comprises a block pivotally secured in the distal end of said arm, said pivot being normal to the longitudinal axis of said arm, said block having a rod-receiving bearing apertured therethrough.